UNITED STATES PATENT OFFICE.

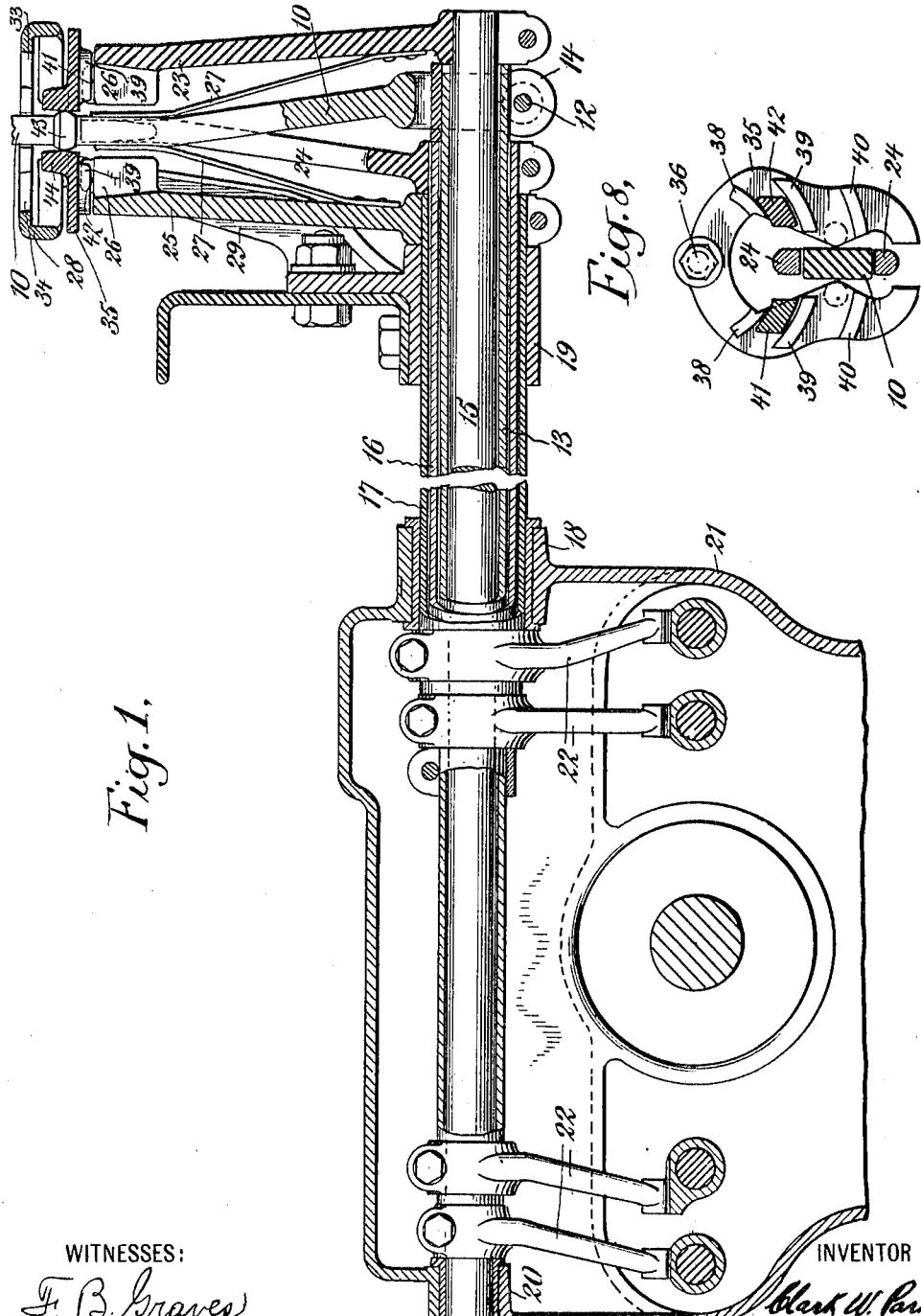

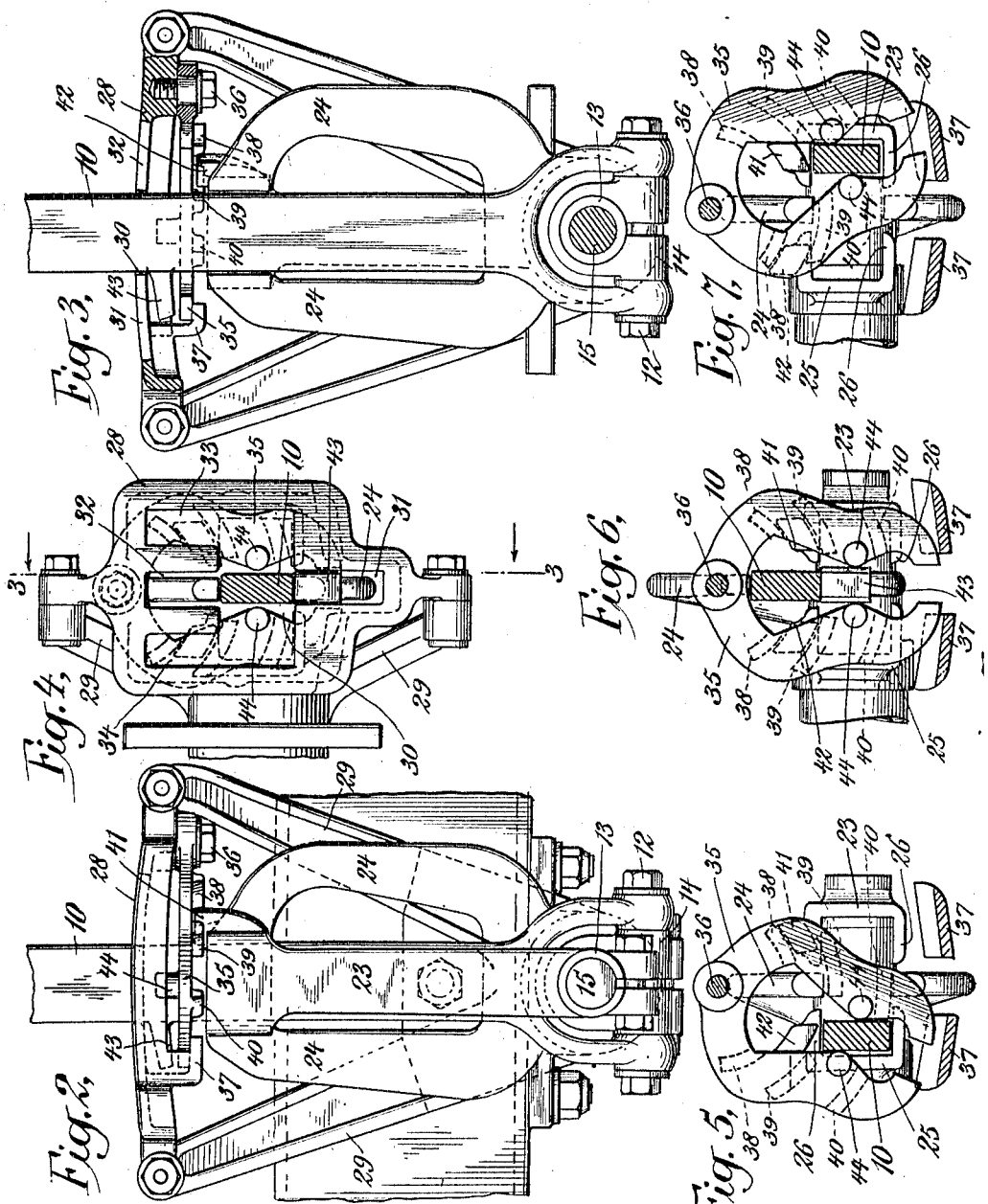

CLARK W. PARKER, OF SPRINGFIELD, MASSACHUSETTS, ASSIGNOR TO PARKER TRANSMISSION AND APPLIANCE COMPANY, OF SPRINGFIELD, MASSACHUSETTS, A CORPORATION OF MASSACHUSETTS.

CONTROLLING-LEVER MECHANISM.

1,120,157.   Specification of Letters Patent.   Patented Dec. 8, 1914.

Application filed March 10, 1911. Serial No. 613,539.

*To all whom it may concern:*

Be it known that I, CLARK W. PARKER, a citizen of the United States of America, and a resident of Springfield, county of Hampden, and State of Massachusetts, have invented certain new and useful Improvements in Controlling-Lever Mechanism, of which the following is a specification, reference being had to the accompanying drawings, forming a part thereof.

My invention relates to controlling lever mechanism of the type employed for controlling and operating transmission gearing and the like, and the particular type of such lever controlling mechanism is that in which a controlling and operating lever may be connected at will with any one of a plurality of coaxially mounted operating arms, whereby operating movements imparted to the said operating and controlling lever may be partaken of by any one of the said operating arms selectively.

My present invention consists in a locking means for positively locking those arms against movement which are not at the time in operative relation with the said operating and controlling lever.

In order that my invention may be fully understood I will now proceed to describe an embodiment thereof having reference to the accompanying drawings illustrating the same, and will then point out the novel features in claims.

In the drawings: Figure 1 is a view in central vertical section through a controlling means constructed in accordance with my invention showing the same as connected with the clutch shipping devices of change speed transmission. Fig. 2 is a view in vertical side elevation of the controlling means. Fig. 3 is a view in section therethrough, the plane of section being indicated by the line 3—3 of Fig. 4. Fig. 4 is a top view of the same with the main operating and controlling lever in horizontal section. Figs. 5, 6, and 7 are detail views in horizontal section showing the controlling lever is adjusted in three different positions. Fig. 8 is an underside view of the locking plate employed, showing the relative positions of the parts of the operating arms for co-engagement therewith, when the said locking plate is in its central position and the controlling lever is in its neutral position.

The main operating and controlling lever 10 of the controlling means is pivotally mounted at 12 upon a hollow shaft or sleeve 13 so that it may oscillate laterally upon the said sleeve, *i. e.*, longitudinally in the plane of the axis thereof. The pivotal connection 12 is, however, disposed upon a collar 14 which is clamped upon the said sleeve 13 whereby the said lever and sleeve are connected to rotate together. The said shaft 13 is one of four nested shafts comprising a solid central shaft 15 within the said sleeve 13, and two other hollow tubular shafts or sleeves 16 and 17 which surround the said sleeve 13. These shafts are mounted in suitable bearings 18, 19 and 20 in a casing 21, and the said shafts are each provided with an arm or lever 22 by which clutches or other mechanism effecting changes in speed or direction relation in the transmission gearing, are operated. At their outer ends the said shafts 15, 16 and 17 are provided respectively with operating arms 23—24—25, the arm 24 being in yoke-like form as is clearly shown in Fig. 3, the arms thereof being in normal proximity to the front and rear edges of the main controlling and operating lever 10 when the same is in its central position laterally considered, while the operating arms 23—25 are each provided at their upper ends with inwardly facing projections 26 constituting forked portions adapted to receive the said main controlling and operating lever 10 when the latter is moved laterally in one direction or the other. Leaf springs 27 connected with the arms 23 and 25 respectively bear against the said main controlling and operating lever and tend to hold it in its central position.

Located immediately above the arms 23—24 and 25 is a horizontally mounted quadrant plate 28, the same being supported by arms 29 which in the present construction are secured to the bearing portion 19. The quadrant plate 28 has a central transverse slot 30 therein (see Fig. 4), a rearwardly extending longitudinal slot 31 opening into the said transverse slot 30, a forwardly extending slot 32 in line with the slot 31, the said slot also opening into the transverse slot, and two other forwardly extending slots 33—34 parallel with the said slot 32 and also opening into the said transverse slot. The longitudinal width of the transverse slot is substantially equal to the longitudinal width of the controlling lever 10, while the lateral width of the slots 31—32—33 and 34 is substantially equal to the lateral width or thickness of the said controlling lever. These various slots confine the transverse and longitudinal movements of the controlling lever 10 as will be well understood. The central longitudinal slots 31—32 permit the lever to be moved backward or forward while in engagement with the operating arm 24. The quadrant plate, however, prevents any lateral movement of the said controlling lever except when the same is in its central longitudinal position as shown in Fig. 4. When in this position it may be moved laterally in either direction so as to move out of engagement with the operating arm 24, into engagement with either the operating arm 23 or the operating arm 25. When in engagement with one or the other of the said operating arms it may be then moved forward longitudinally in the slot 33 or the slot 34 as the case may be, and will be guided and limited in its movement therein as will be well understood. For the purpose of locking the said operating arms 23—24—25 except when they are connected in operative relation with the said controlling and operating lever, I have provided a locking plate 35 having various abutments for co-action with parts of the said operating arms. This locking plate is pivoted at 36 to the underside of the quadrant 28 as shown, the said pivot pin 36 being vertical whereby the said locking plate moves through a horizontal path. The locking plate is in the form of two arms which extend laterally upon opposite sides of the main controlling lever as shown, the said arms having portions for substantial engagement with the lateral faces of the said operating and controlling lever. The free ends of the said arms of the locking plate are supported and guided in stationary brackets 37 dependent beneath the said quadrant plate. On the underside of the locking plate are three sets of downwardly projecting walls or abutments 38—39—40, the said walls or abutments being concentric with the pivotal axis 36 of the plate. The operating arms 23 and 25 are provided respectively with projections 41—42 adapted to be normally received between the walls 38 and 39 of the locking plate 35. Similarly the walls 39—40 are in line with the opening between the forked arms of the central operating element 24 and are adapted to pass between the forked extremities thereof when the locking plate moves laterally in one direction or the other. By reason of its connection with the main controlling lever the said locking plate partakes of the lateral movements thereof. When the controlling lever is in a central position the locking plate is in a central position as is shown in Figs. 4 and 6, and in such case the upper projections 41 and 42 of the operating arms 23 and 25 are retained between the walls 38 and 39 of the locking plate and movements of the said operating arms are absolutely prevented. At this time the central operating arm 24 is, however, free to move backward and forward with the said main controlling and operating lever 10. It may be noted that when the main operating and controlling lever 10 moves forward it moves out of engagement with the arms of that part of the locking plate which normally engages it, and to avoid the losing of control thereof the said lever is provided with a rearwardly extending toe 43 which at such times is received between upwardly extending studs 44 upon the said plate. By this means the controlling lever still retains control of the locking plate even after the lever has moved all the way forward as is shown in Fig. 6.

When the main controlling lever is moved to the left as shown in Fig. 5 of the drawings so as to cause it to disengage the central lever 24 and to engage the operating arm 25, the locking plate will be moved over so that the walls 39 and 40 upon one side thereof will pass between the forked extremities of the central operating arm 24 so as to lock the same against movement. At this time the walls 38 and 39 upon the right hand side of the said plate will still retain their engagement with the projection 41 of the lever 23 so as to lock it in its neutral position, while on the other hand the walls 38 and 39 upon the other side of the plate will move clear of the projection 42 of the operating arm 25 so as to permit a free movement thereof with the said main operating and controlling lever. Similarly when the main operating and controlling lever is thrown over to the right as shown in Fig. 7 the operating arms 24 and 25 will be locked while the operating arm 23 will be freed so that it will be in a condition to be moved by the main operating and controlling lever in its forward operating movement.

From the foregoing it will be seen that I have provided a very positive locking means for such of the operating arms as are not intended to be moved with the main operating and controlling lever at the time.

What I claim is:

1. In combination, a plurality of shafts, a lever associated with one of said shafts and movable in two directions, a plurality of operating arms each associated with one of the other shafts and extending laterally therefrom, and each designed to coöperate at its free end with said lever, and a locking plate associated with the lever to partake of one of the movements thereof, and having parts for interlocking with said free ends of a plurality of the operating arms and leaving another of said arms free to be operated by the lever, substantially as and for the purpose described.

2. The combination with a lever movable in two directions for operating movements in a longitudinal path and selective movements in lateral paths, of a plurality of operating arms for selective engagement with the lever, and a locking plate movable laterally with the lever and having parts for normally interlocking with a plurality of the operating arms and leaving one of said arms free to be operated, the part for interlocking with the intermediate arm being arranged out of transverse alinement with the parts for interlocking with the arms on opposite sides of the intermediate arm.

3. The combination with a lever pivoted in two directions for operating movements in a longitudinal path and for selective movements in a lateral path, of a plurality of operating arms for selective engagement therewith in its several laterally selected positions, and a horizontally movable vertically pivoted locking plate slidably connected with the said lever to partake of its lateral movements, the locking plate being pivoted to a part fixed from movement with the lever and having parts for interlocking engagement with such of the said operating arms as are not at the time in engagement with the lever.

4. In mechanism of the class described, the combination with four concentrically mounted shafts, of a controlling lever secured to partake of movements of rotation of one of the said shafts but laterally pivoted with respect thereto, three operating arms respectively connected to the other shafts and having portions for respective engagement with the said lever in its several laterally selected positions, and a horizontally movable vertically pivoted locking plate arranged to partake of the lateral movements of the said controlling lever and having parts arranged for interlocking engagement with those operating arms which are not at the time in operative engagement with the said controlling lever.

5. The combination with a lever pivoted in two directions for operating movements in a longitudinal path and for selective movements in a lateral path, of a plurality of operating arms for selective engagement therewith in its several laterally selected positions, a horizontally disposed quadrant having an intermediate lateral slot and longitudinal slots in connection therewith for guiding and limiting the said lever in its movements, and a horizontally movable vertically pivoted locking plate located beneath the said quadrant and connected with the said lever to partake of its lateral movements, the said locking plate having parts for interlocking engagement with the said arms and adapted when moved with the lever in the lateral movements of the latter to free the operating arm engaged by the said lever and to lock all of the other said arms.

6. In mechanism of the class described, the combination with four concentrically mounted shafts, of a controlling lever secured to partake of movements of rotation of one of the said shafts but laterally pivoted with respect thereto, three operating arms respectively connected to the other shafts and having portions for respective engagement in its several laterally selected positions, a horizontal quadrant having a lateral slot for permitting the controlling lever to move laterally when in a neutral position, and having a plurality of longitudinally disposed slots for permitting the controlling lever to move when in its laterally selected position, the said quadrant guiding and limiting the said controlling lever in its movements, and a horizontally movable locking plate vertically pivoted beneath the said quadrant and arranged to partake of the lateral movements of the controlling lever, the said locking plate having parts arranged for interlocking engagement with the said arms.

7. In mechanism of the class described, the combination with four concentrically mounted shafts, of a controlling lever secured to partake of movements of rotation of one of the shafts but laterally pivoted with respect thereto, three operating arms respectively connected to the other shafts and having portions for respective engagement with the said lever in its several laterally selected positions, a horizontally disposed movement limiting and guiding quadrant plate for the said controlling lever, a locking plate vertically pivoted beneath the quadrant to move in a horizontal path, the said locking plate having arms arranged in proximity to the opposite sides of the said controlling lever and having downwardly projecting concentric walls for correlative engagement with parts of the three said operating arms.

CLARK W. PARKER.

Witnesses:
Wyman C. Parker,
Miss B. Pinault.